(No Model.) 5 Sheets—Sheet 2.
J. C. HENRY.
ELECTRIC RAILWAY CAR.
No. 426,379. Patented Apr. 22, 1890.
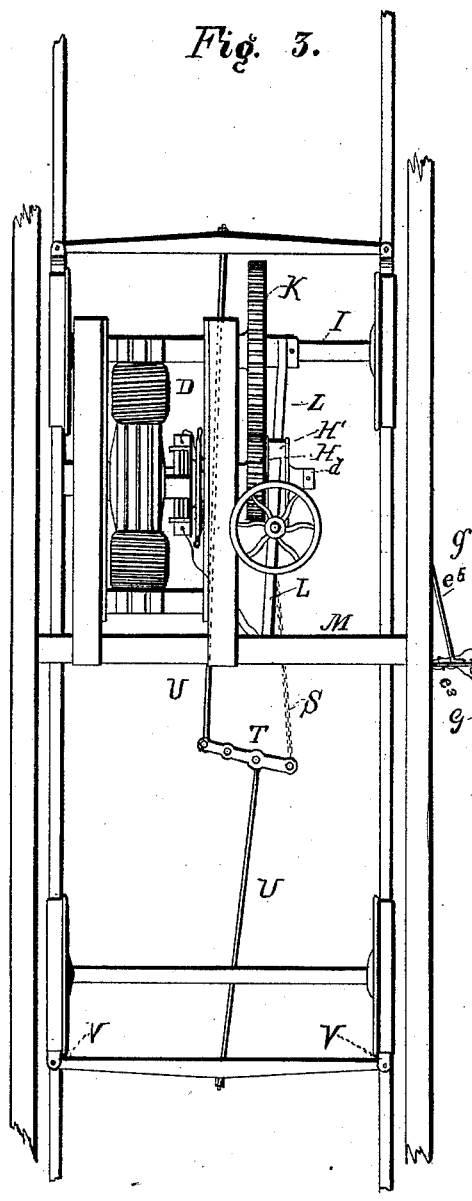
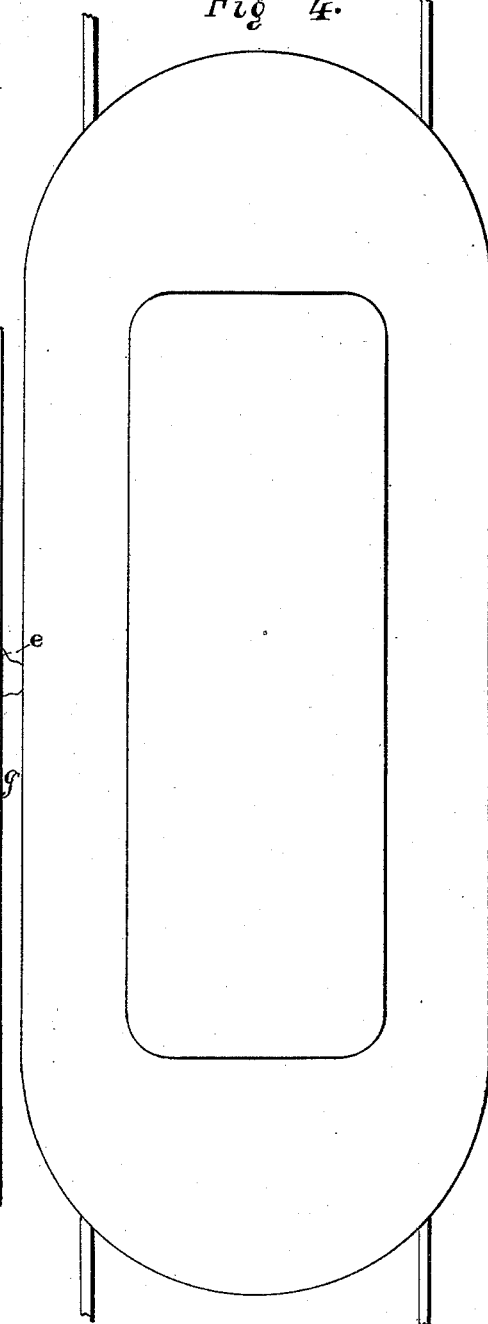
Witnesses
Inventor
John C Henry
By his Attorney
Rich'd N. Manning (No Model.) 5 Sheets—Sheet 3.
J. C. HENRY.
ELECTRIC RAILWAY CAR.
No. 426,379. Patented Apr. 22, 1890.
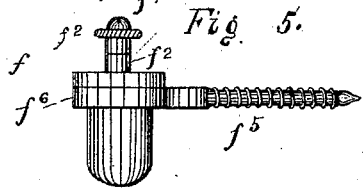
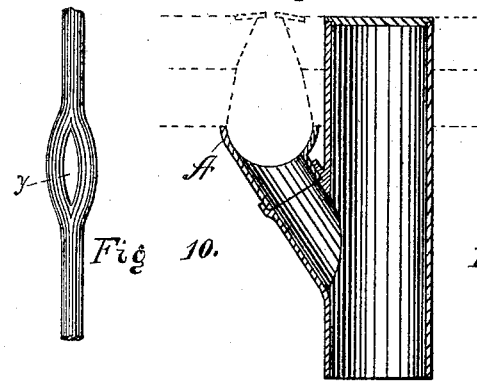
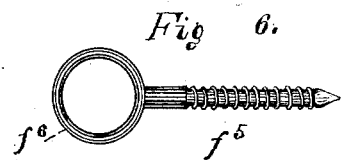
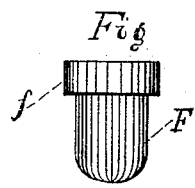
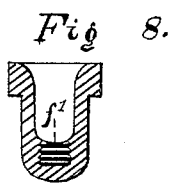
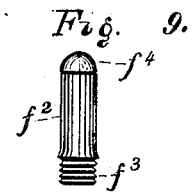
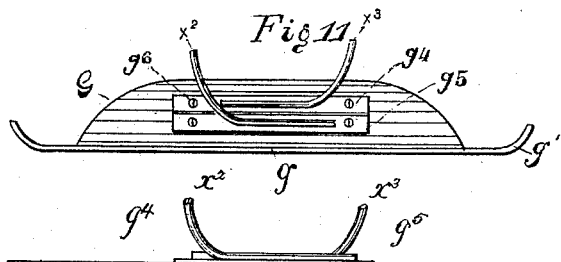
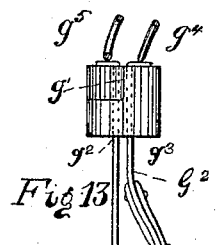
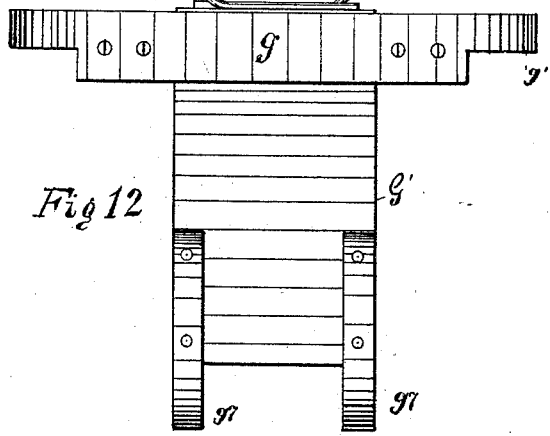
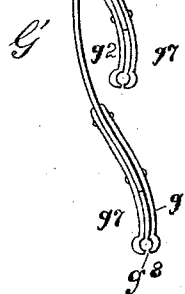
WITNESSES:
INVENTOR
John C. Henry
BY
Rich't N. Manning
ATTORNEY (No Model.) 5 Sheets—Sheet 4.
J. C. HENRY.
ELECTRIC RAILWAY CAR.

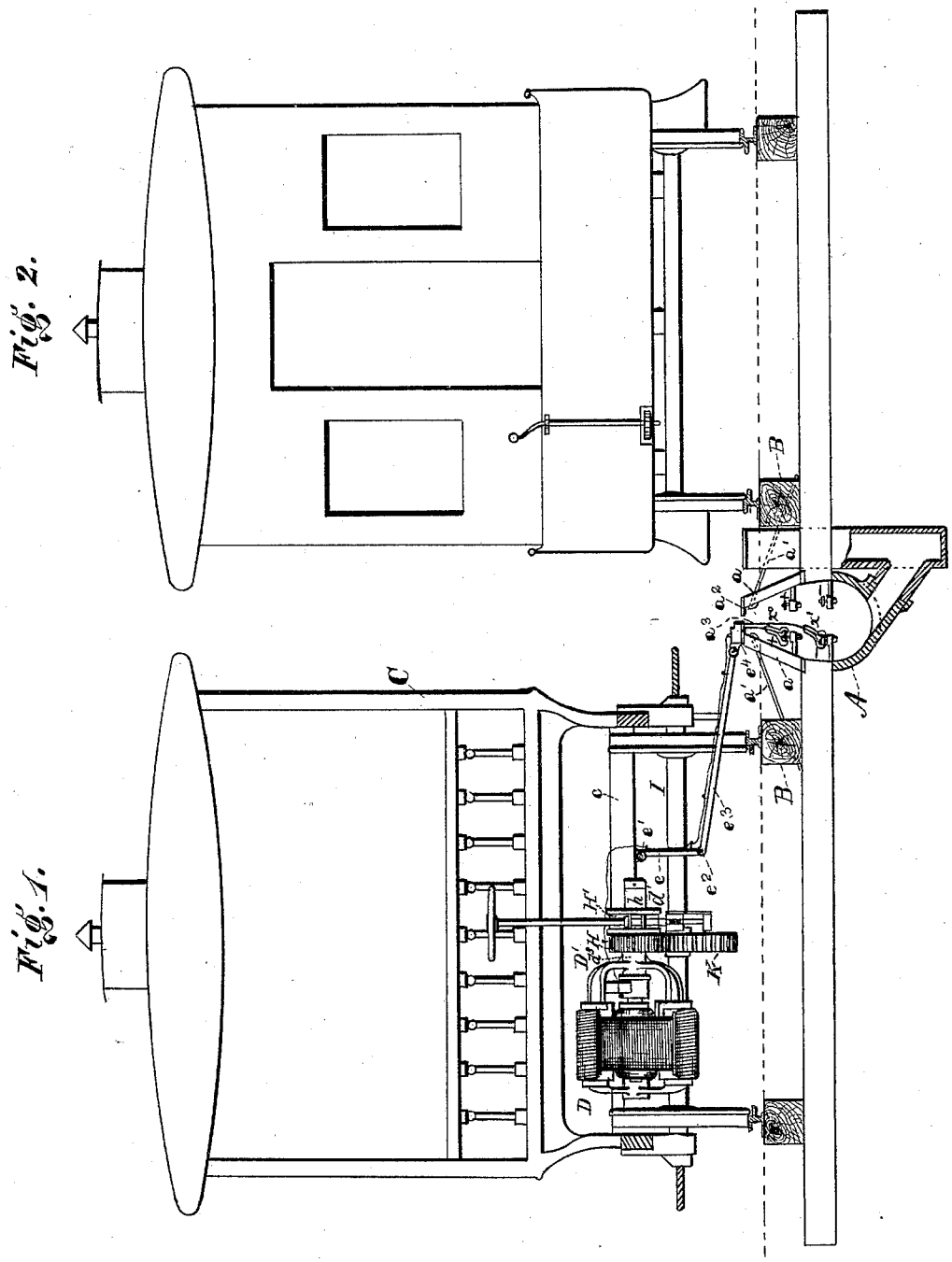

No. 426,379. Patented Apr. 22, 1890.

Attest:
E. Arthur
W. E. Knight

Inventor.
John C. Henry
By Knight Bros
his Attys (No Model.) 5 Sheets—Sheet 5.

J. C. HENRY.
ELECTRIC RAILWAY CAR.

No. 426,379. Patented Apr. 22, 1890.

Witnesses:
A. P. Knight
M. E. Bidgood

Inventor:
John C. Henry
By Knight Bros
his Attorneys

UNITED STATES PATENT OFFICE.

JOHN C. HENRY, OF KANSAS CITY, MISSOURI.

ELECTRIC-RAILWAY CAR.

SPECIFICATION forming part of Letters Patent No. 426,379, dated April 22, 1890.

Application filed July 5, 1887. Serial No. 243,337. (No model.)

*To all whom it may concern:*

Be it known that I, JOHN C. HENRY, a citizen of the United States, residing at Kansas City, in the county of Jackson and State of Missouri, have invented certain new and useful Improvements in Electric Railways; and I do hereby declare the following to be a full, clear, and exact description thereof, reference being had to the accompanying drawings, forming a part of this specification.

My invention has for its object, first, in subway-conduits for electrical conductors to support in tiers a series of electric conductors alternating in polarity and connected in pairs to the generator and insulated at the supporting-points; second, to support in tiers a series of electric conductors in circuit and connect the same with the opposite poles of an electric motor on the vehicle; third, in an electric railway having a subway-conduit to afford a contact-carriage which will follow the movements of the carriage and support the contacts in their passage over the conduit; fourth, to afford, in electric railways having a conduit between the tracks, insulated carriers for opposite vehicles which will pass each other in transit and retain the grip on the conductors without obstruction, and, fifth, to regulate at will and at the same time the passage of current through the armature of the motor and the relative speed of the shaft and the car-axle by a special epicycloidal or planetary gear of the construction hereinafter described.

Figure 15:
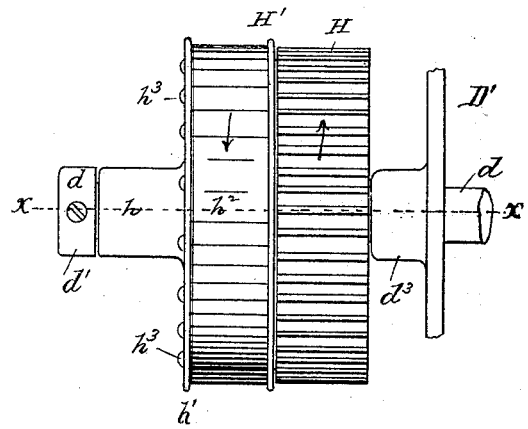
Figure 16:
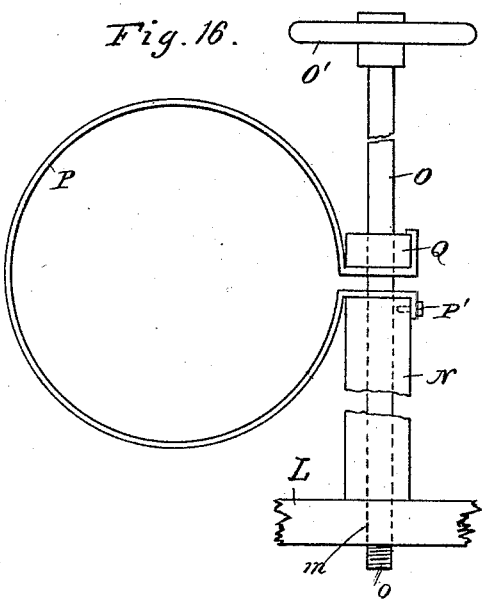
Figure 17:
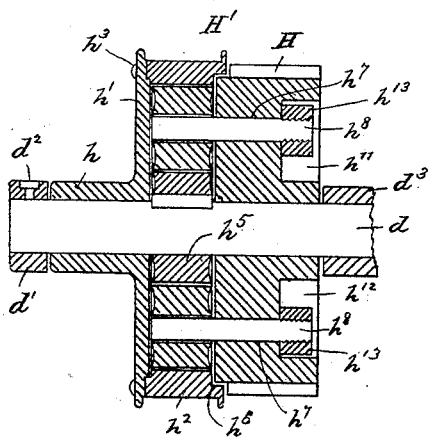
Figure 18:
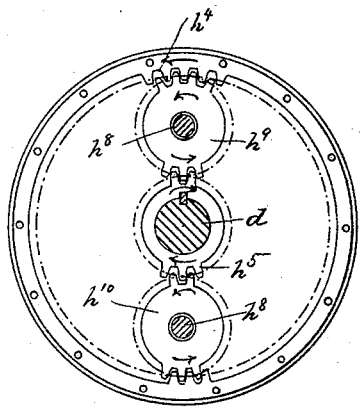
Figure 19:
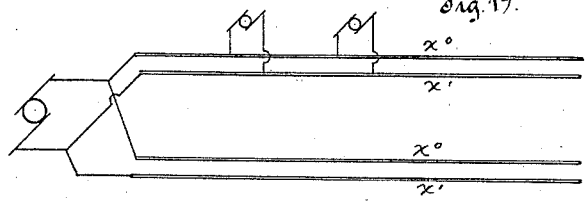
Figure 20:
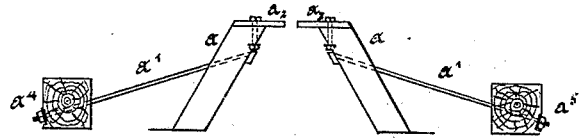
Figure 21:
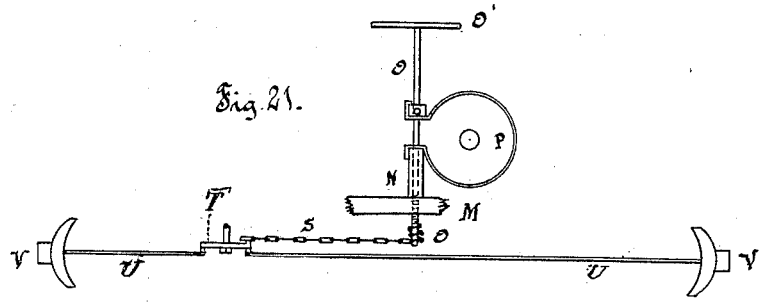

In the drawings, Figures 1 and 2 represent end views of parallel vehicles on the trackway, between which tracks is shown the subway-conduit, the rear end of the platform and the rear axle of one vehicle being removed, showing the contact-carrier, the motor, and also the contact in the tube connected with the electrical conductors and motor. Figs. 3 and 4 are plan views of the vehicles and also of the conduit, showing the contact-carriers approaching each other, one of said vehicles having the top and floor removed, showing the motor. Fig. 5 is a view of the oil-cup insulator complete. Fig. 6 is a view of the cup-holder. Fig. 7 is a side view of the cup in detail. Fig. 8 is a vertical sectional view of the cup. Fig. 9 is a view of the insulated pier which supports the conductor. Fig. 10 is a view of a portion of an electrical conductor, showing the means of attachment to the insulated pier. Fig. 11 is a plan view in detail of the contact-carrier, showing the branch connections in part which are connected with the motor. Fig. 12 is a side elevation of the electrical contacts and carrier attached to a single car. Fig. 13 is an end view of one of the contacts and carrier. Fig. 14 is a sectional view taken through the conduit and through one of the vertical sewer-pipes. Figs. 15, 16, 17, and 18 show the epicycloidal gear, Fig. 15 being a face view, Fig. 16 a side view of the friction-band and brake-rod, Fig. 17 a vertical longitudinal sectional view taken on the line X X of Fig. 15, and Fig. 18 an interior view of the case with the outer flange removed. Fig. 19 is a diagram showing the two pairs of conductors and their connections to the generator. Fig. 20 is a cross-section of a portion of the conduit, showing the bracing-rods for the sides thereof. Fig. 21 shows in elevation the brake-rod with its connections both to the brake-operating device and the friction-clutch.

In carrying my invention into practice, between the opposite parallel tracks of an electric railway is arranged a subway-conduit A, the object being to afford an underground tube for opposite vehicles, in which the conductors may be placed and contacts from said opposite vehicles connected therewith in such a manner as to occupy but little space and pass each other in transit.

For the purpose of enabling the alternate polarity of the series of conductors in circuit to be preserved in the conduit and in electrical connection with the respective opposite motors upon the opposite vehicles, I place in said conduit the conductors $x^0$ $x'$ in tiers and support the same at convenient points in the conduit by means of the pins in the oil-insulation cups F. These cups F are cylindrical and made with an exterior concentric flange $f$. In the bottom of the cup F and from within is made the screw-threaded recess $f'$, and in said recess is fitted the screw-threaded end $f^3$ of the insulated pin $f^2$. The upper end of pin $f^2$ extends above the horizontal surface of the cup so far as is necessary to receive and support the conductors $x^0\ x'$ thereon. Each conductor at the supported points is divided, as at $y$, (see Fig. 10,) and an opening made of sufficient width to receive a screw $f^4$, which is fitted to a screw-threaded perforation in the upper end of the pin $f^2$, the head of the screw retaining the conductor in place. These cups F·are held in position by the screw-bolt $f^5$, upon the end of which is made a ring $f^6$. The screw-bolts $f^5$ are then screwed into the opposite side of the conduits, one above another, at suitable heights to connect the contacts with the conductors, and the cups are then placed in the rings $f^6$, the flange $f$ on said cups supporting them in place. The cup F, which is of insulating material, is then filled with oil, which surrounds and is in contact with the pin $f^2$, thereby aiding in insulating the conductors.

The conductors $x^0\ x'$, which are placed on the pins in cups F, are arranged one above another or in tiers, and are connected to the poles of a generator in the following manner: The positive polarity of the conductors is indicated by the sign + and the negative by the sign −. The upper and lower conductors on each respective side of the conduit are of opposite polarity, the lower conductor returning the current, and these conductors $x^0\ x'$ are united near and to the respective poles of the generator in pairs through the medium of branch wires and insulated conductors.

For the purpose of connecting the motors on the car with the conductors $x^0\ x'$ and enabling the contacts of opposite vehicles to pass without obstruction, I make the carriage G in the form of a segment of an ellipse from a flat piece of metal, and on the straight edge of said segment or carriage I place in a vertical relation a flat insulated plate $g$, the ends $g'$ of which are bent in a curved shape in the direction of the plate G, and the width of said plate is equal to the thickness vertically of the carriage G. Through the carriage G, in suitable slots $g^2\ g^3$, are inserted the vertical transverse conducting-plates G' G², one of said plates being longer than the other and placed a slight distance apart in a parallel relation and extending in the longitudinal direction of the carriage G about one-half its length and at equal distances from opposite ends. Upon the respective upper ends of the plates G' G² are fixed rigidly the horizontal metal conducting-strips $g^4\ g^5$, which are wider than slots $g^2\ g^3$ and are fastened to the carriage G by the screws $g^6$. Projecting upwardly from the plates $g^4\ g^5$ are the branch conductors $x^2\ x^3$, which are connected with the motor, as hereinafter described. Secured to the opposite sides of the plates G' G² and extending below said plates are the electrical contacts $g^7\ g^7$, the extreme lower ends of which contacts are curved at $g^8\ g^8$ toward each other and extend from opposite plates so far downwardly as to grasp and inclose the upper and lower conductors, which are in tiers and are made so as to yield and pass over the points of supports heretofore described. For the purpose of enabling the contact-carriage attached to one car to pass another carriage attached to an opposite car, the upper sides $a\ a$ of the conduit A are laterally adjustable and are held by the adjustable rods $a'\ a'$, which pass through the sides of the said portions $a\ a$, and also through the longitudinal beams B B, and are adjusted by means of the nuts $a^4\ a^5$ on the ends of said rods $a'\ a'$, which nuts are on opposite sides of the portions $a$ of the conduit, so that the contact-carriages may be given more or less space, as required to pass each other.

Pivotally connected with the under portion of the floor $c$ of the vehicle C, at a point equidistant from the opposite ends of the vehicle and at the proper distance away from the motor D toward the side of the vehicle, is a short depending arm $e$, the upper end of which arm is hinged at $e'$ to the bottom of the vehicle, as aforesaid.

To the lower end of the arm $e^2$ a long arm $e^3$, which extends to the conduit A, is hinged at its opposite end to the sliding contact-carriage G by the hinge $e^4$. To give stability to the arm $e^3$ a brace $e^5$ is pivotally attached to the side beam of the vehicle, and to said arm $e^3$, as seen in Fig. 3, so as to move with said arm the degree required upwardly. The branch conductors $x^2\ x^3$ are then connected to the opposite poles of the motor D, and are carried along the arm $e\ e^3$ and connected with the carriage G, as heretofore described.

In the passage of the contact-carriage G G the said carriage rests upon the slot-rail $a^2\ a^3$, and in case of any unevenness of the surface of the rails or in the movements of the carriage the arms $e^3$ permit the rise and fall of the contact-carriage. As the opposite carriages G G approach each other the curved ends $g'$ of the carriage contact and the said carriages are forced toward the opposite side of the slot and against the sides of the slot-rails $a^2\ a^3$.

For the purpose of regulating by a yielding leverage the speed communicated from the motor-shaft to the car-axle, I attach loosely to the motor-shaft $d$ a cylinder-case H', which is constructed as follows: A sleeve $h$ is first placed loosely on shaft $d$ near its end, and from the end of said sleeve toward the motor I extend radially a flange $h'$, and at right angles to said flange, and extending from the side thereof opposite to that attached to the sleeve $h$, I attach by the bolts $h^3$ a flange $h^2$, concentric with the motor-shaft $d$, and on the inner side of the flange $h^2$, I form a circular rack $h^4$. Upon the shaft $d$, concentric with the rack $h^4$, I key a small spur-gear $h^5$. A rabbet $h^6$ is made in and around the outer edge of the flange $h^2$, for the purpose hereinafter described. I then make a spur-gear H to fit loosely on the shaft $d$ on the side of the case H' toward the field-magnets and corresponding in thickness to the length of the teeth $h^4$, and extending radially nearly to the outer side of the flange $h^2$. A portion of the outer edge of gear H is then cut away cylindrically, removing the ends of the teeth, so as to permit the said edge of the gear to fit and revolve in the rabbet $h^6$ in the flange $h^2$.

Through the sides of the gear H, on opposite sides of the axle $d$, and at a point midway between the ends of its teeth and the said axle $d$, I make the perforations or bearings $h^7$ $h^7$, through which are inserted the journals $h^8$, and within the sides of the cylindrical flange $h^2$, I place on journals $h^3$ $h^8$, in gear with teeth $h^4$ on said flange and also with the spur-gear $h^5$ of the shaft $d$, the spur-gears $h^9$ $h^{10}$, thus forming an epicyclic train. Recesses $h^{11}$ $h^{12}$ are made in the outer side of the gear H, around the ends of the journals $h^7$ $h^7$, which ends are screw-threaded and the nuts $h^{13}$ fitted thereto in said recesses. I then key on the forward axle I of the car a gear K, which is placed in meshing relations with the gear H on the shaft $d$ of the motor. Upon said axle I is attached one end of a bar L, (see Fig. 3,) which passes beneath the case H', the opposite end being attached to the under side of the cross-beam M of the car-floor, and upon bar L, in rear of the flange $h^2$ of the case H', is rigidly attached in a vertical relation a sleeve N, which extends upwardly to a point in line with shaft $d$. Through the bar L, in a vertical relation with the sleeve N, is made a screw-threaded perforation $m$. A brake-rod O is then inserted in a vertical relation through the sleeve N, the lower end of which rod is provided with a screw-thread $o$, which fits the threaded perforation $m$ in the bar L. On rod O, a short distance above the sleeve N, is fixed rigidly a cylindrical stop Q. A fixed metal band P is then perforated at opposite ends and a short distance from said ends and said band extended around the outer side of the flange $h^2$ of the case H' and then brought together, and the rod O inserted through opposite perforations, so that when rod O is placed in the sleeve N the opposite ends of the band P are between the stop Q and said sleeve N. I then bend the end of the band which rests on the upper end of sleeve N over one end of said sleeve and secure the same by the screw P' thereto, the opposite level end of the band P being bent upwardly over the edge of the stop Q. Upon the upper end of rod O is a wheel O'. For the purpose of keeping the case H' and the gear H in close relations, I place on shaft $d$, at its extreme end and bearing against the end of the sleeve $h$, a cylindrical stop $d'$, which is held fixedly thereto by a screw $d^2$. The gear H abuts against the end of the sleeve $d^3$, carrying the field-magnet frame D', in which the shaft $d$ is journaled.

In the operation of the epicyclic train the brake-rod O is turned to bring the opposite ends of the band P together, which draws as tightly as needed on the case H', the motor being permitted to run constantly, while the car is stationary. The arrows show the direction in which the gear rotates. As the gear $h^5$ rotates in union with the shaft $d$, the gears $h^9$ $h^{10}$ turn in opposite directions and rotate the case H'. The brake then being applied and the band brought to bear firmly upon the said case H', its action is stopped, and consequently the gears $h^9$ $h^{10}$ rotate independently of the case H', and communicate a forced movement to the larger gear H, and thence to the gear K on the axle of the car.

When the speed of the car is to be checked, the clutch of the band P is lessened upon the case H', and it being permitted to revolve, the power exerted by the gears $h^9$ $h^{10}$ is also lessened in a corresponding degree, and when the speed of the car is checked the band and gear act uniformly to reduce the speed without shock to the motor and in a degree hitherto unattainable.

As shown in Figs. 3 and 21, the brake-rod O is connected to the usual system of brake-operating devices, consisting of chain S, floating lever T, rods U, and brake-beams V. The effect of this is that when the brakes are applied to the car-wheels the friction-clutch P is at the same time released, so that the motor runs free, while in tightening the friction-clutch to operatively connect the motor to the car-axle the brakes are thrown off the car-wheels.

In electric-railway propulsion, when the vehicle is stationary, the motor is receiving a current sufficient to cause it to revolve at a high rate of speed, producing a back electro-motive force, which holds the current back until it is needed to start the car. When the car is to be started, the band is gradually tightened, which brings in a yielding or variable leverage between the motor and car-axle. Thus the car can readily be started without shock at a very low rate of speed and gradually increased at will.

The current conditions are as follows: When the motor is revolving at a high rate of speed, owing to the back-pressure, very little current is used. When the work is applied, the momentum of the armature is used to help start the car. At the same time the back-pressure is decreased and the initial current is automatically increased.

It is very plain to be seen that with this mechanism an abnormal flow of current can be avoided through the motor.

When the car is to be stopped, the band is disengaged and the momentum of the armature preserved.

Having fully described my invention, what I now claim as new, and desire to secure by Letters Patent, is—

1. In electric railways, the combination, with a subway-conduit provided with slot-rails and a slot between said rails, of a generator and a series of electric conductors alternating in polarity, and connected in pairs to the opposite poles of said generator, supported in tiers, and having the lower conductors in said series the return-conductors.

2. The combination, in electric railways, with the subway slotted conduit and the slot-rails, of a sliding carriage on said rails, a generator, and electrical conductors in said conduit alternating in polarity, and connected to the opposite poles of the generator in pairs, flexible conducting-plates on said carriage, and yielding grasping contacts on said conducting-plates embracing the conductors and a motor in said circuit.

3. The combination, in electric railways, with two opposite parallel tracks, of a subway slotted conduit between said tracks and having suitable slot-rails, electrical conductors in said conduit in electric circuit, vehicles on opposite tracks and electric motors on said vehicles, sliding carriages on said slot-rails, and flexible arms connecting said carriages with said vehicles, and yielding contacts on said sliding carriages embracing the said conductors, insulated friction-plates on said carriages having inclined ends, and branch conductors connecting said contacts on said carriages with the poles of the motor on said vehicle.

4. In electric railways, the combination, with a subway-conduit, of electric conductors and insulating-cups attached to and within said conduit provided with oil, and a support for said conductors in said cups surrounded by and in contact with said oil and insulated by the cups and oil.

5. In an electric railway, a motor mounted on a car having a current-supply resisted by the revolving armature, an epicyclic or planetary train of gear driven by the motor-shaft, in combination with a clutching device adapted to engage the internal gear of said train to connect the gear with the revolving armature and to control the current-supply.

6. In an electric railway, the combination of main conductors parallel with the track, the car, a motor on the car, and an electrical connection with the main conductors having its current-supply automatically controlled by the armature speed, a pinion fixed on the motor-shaft surrounded by an internal gear, intermediate pinions in engagement with both of them, the latter adapted to drive an external gear loosely mounted on the motor-shaft, the internal gear, the car-axle, or all of them.

7. In an electric railway, the combination of a car driven by a motor, brakes on the car to retard the wheels, an epicyclic or planetary train of gearing between the motor-shaft and car-axle, a clutch, and a brake stem or lever adapted to operate either the clutch or car-brakes.

8. In an electric railway, the combination of a motor mounted on a car, internal gear loose on the motor-shaft, being driven from a central pinion and intermediate gear, a spur-gear loosely mounted on the motor-shaft, and having projecting pins adapted to receive the intermediate pinions, for the purpose set forth.

9. In electric transportation, a vehicle and its axle, and a motor on said vehicle and its driving-shaft, said motor being supported at one end on the vehicle-axle and having spring-support from the vehicle at the other end, and a suitable source of electric supply, in combination with an epicyclic train of gear and suitable power-conveying means connected therewith.

10. In electric railways, the combination, with a vehicle and its axle, of a motor and its driving-shaft, said motor being supported at one end on the vehicle-axle and having spring-support from the vehicle at the other end, a generator in an electric circuit connecting with said motor, and an epicyclic train of gear on said motor-shaft, and suitable power-conveying devices connecting said train of gear with said axle, and a yielding lever in contact with and for regulating the speed of said train of gear.

11. The combination of a motor mounted on a car, means for supplying current thereto, an epicyclic or planetary train of gear driven by the motor-shaft and connected to the car-axle, and a clutch for arresting or releasing the internal gear, and thus bringing the motor-shaft into and out of operative connection with the car-axle.

12. In electric railways, the combination, with a vehicle and its axle, of a motor and its driving-shaft, a brake on the axle and a generator electrically connected with said motor, gears on said motor-shaft and axle in meshing relation, a clutch regulating the speed of the said gear, and a brake-rod connected with said clutch and the said car-brake and operating said clutch and brake alternately.

13. The combination of a motor-shaft, an epicyclic gear thereon, a friction-wheel connected to the internal gear-wheel and bearing on said shaft, and means for braking said friction-wheel.

14. In an electric railway, working conductors parallel with the track, a traveling contact on said conductors, being supported from above and held to the top and sides of the conductors, having arms which grasp and make contact with the top and sides of and extend somewhat under the conductors by spring-pressure.

15. In an electric railway, a sliding traveling contact grasping the conductor, the working parts forming springs which contact with the top and sides of and extend somewhat under the conductor and completing the circuit.

16. In an electric railway, the combination of main parallel conductors along the roadway, being protected by a conduit, cars on separate tracks on either side of said conduit, motors on the cars in connection with the main parallel conductors, traveling electrical contacts, and a single slot or opening in said conduit, for the purpose described.

17. In an electric railway having a single subway-conduit between double tracks, with electrical conductors therein, slot-rails on the surface of said conduit, sliding carriages on said slot-rails adapted to complete the circuit between the main conductors and the motor, and having beveled ends to avoid interference between sliding contacts moving in opposite directions.

JOHN C. HENRY.

Witnesses:
S. B. LIGHTCAP,
S. L. C. HOSSON.